(12) United States Patent  
Sato et al.

(10) Patent No.: US 7,365,916 B2  
(45) Date of Patent: Apr. 29, 2008

(54) ASPHERICAL LENS AND OPTICAL INSTRUMENT USING THE SAME

(75) Inventors: Haruo Sato, Kawaguchi (JP); Yoko Kimura, Ayase (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/236,829

(22) Filed: Sep. 28, 2005

(65) Prior Publication Data

US 2006/0066961 A1    Mar. 30, 2006

(30) Foreign Application Priority Data

Sep. 30, 2004    (JP)    ............... 2004-289042

(51) Int. Cl.
    *G02B 3/02*    (2006.01)
    *G02B 13/18*   (2006.01)
(52) U.S. Cl. .................. 359/718; 359/749; 359/754
(58) Field of Classification Search ............... 359/708, 359/713–718
    See application file for complete search history.

(56) References Cited

U.S. PATENT DOCUMENTS 4,094,585 A *   6/1978   Betensky ................. 359/708
6,819,491 B2 * 11/2004   Takahashi et al. ......... 359/566
6,872,334 B2    3/2005   Karita
2003/0107824 A1* 6/2003  Takeuchi ................. 359/796

FOREIGN PATENT DOCUMENTS

| JP | 63-157103 A   | 6/1988 |
| JP | 06-130209 A   | 5/1994 |
| JP | 07-227916 A   | 8/1995 |
| JP | 2000-227548 A | 8/2000 |
| JP | 2002-250862 A | 9/2002 |
| JP | 2003-019716 A | 1/2003 |
| JP | 2003-159717 A | 6/2003 |
| JP | 2003-159718 A | 6/2003 |
| JP | 2003-159719 A | 6/2003 |
| JP | 2004-013081 A | 1/2004 |

* cited by examiner

*Primary Examiner*—Jordan M. Schwartz  
(74) *Attorney, Agent, or Firm*—Miles & Stockbridge, P.C.

(57) ABSTRACT

An object is to provide an aspherical lens having compactness in dimension, large degree of freedom in design, and good optical performance, with increasing in productivity, and lowering production cost. The aspherical lens constructed by a substrate member A and a member B having different composition formed on the substrate member A. A boundary between the substrate member A and the member B having different composition is formed by a first aspherical surface $R_{AB}$, and a surface of the member B having different composition opposite to the boundary being formed by a second aspherical surface $R_B$ having higher fabrication accuracy than that of the first aspherical surface $R_{AB}$, and given conditional expressions are satisfied.

44 Claims, 11 Drawing Sheets

ASPHERICAL LENS AND OPTICAL INSTRUMENT USING THE SAME

The disclosures of the following priority application is herein incorporated by reference:

Japanese Patent Application No. 2004-289042 filed on Sep. 30, 2004.

BACKGROUND OF THE INVENTION

1. Field of the Invention

The present invention relates to an aspherical lens and an optical instrument using the aspherical lens.

2. Related Background Art

Generally, when a aspherical lens is to be fabricated by means of glass molding, since the dimension of the aspherical lens to be molded is restricted by required precision thereof, degree of freedom upon fabricating an aspherical lens in particular a large one becomes narrow. Even if a large diameter aspherical lens can be fabricated, the fabricating cost becomes extremely high. Moreover, an aspherical lens is fabricated by means of a fine grinding or a polishing, in addition to the high fabrication cost, it has a structural difficulty in grinding a concave surface, so that it becomes crucial restriction on designing an aspherical surface.

Accordingly, a compound type aspherical lens constructed by forming an optical member made of a resin and the like with an aspherical surface on a spherically polished optical substrate such as a glass substrate has been proposed. An optical system in which such an aspherical lens is installed has been proposed in Japanese Patent Application Laid-Open No. 2000-227548. However, in this compound type aspherical lens, when the shape of the resin aspherical surface becomes largely different from that of the spherical glass substrate, the thickness of the resin becomes large, so that it becomes difficult to fabricate an aspherical surface with high precision. Moreover, there is a defect that variation in the shape excessively increases upon variation in environment such as temperature and humidity. Accordingly, it has been impossible to realize a compound type aspherical lens with a large diameter and a large resin thickness.

In such background, Japanese Patent Application Laid-Open No. 63-157103 has proposed a compound type aspherical lens that an aspherical surface with low precision is formed on a glass substrate by means of a fine grinding or a polishing and, on this aspherical surface, a resin aspherical surface having high precision and a substantially equal thickness is formed.

However, in the compound type aspherical surface disclosed in Japanese Patent Application Laid-Open No. 63-157103, in order to prevent the aspherical surface with low precision formed on the glass substrate from performing refraction effect, a glass material having low refractive index corresponding to refractive index of the resin is applied as the glass substrate. Accordingly, in this technology, since refractive index of the glass substrate is fixed to that of the resin, degree of freedom in design has been excessively restricted.

When a wide-angle lens or a super wide-angle lens is to be designed by using such a compound type aspherical lens as, in particular, a negative lens, since a glass material having refractive index and Abbe number corresponding to the resin material is applied, it becomes difficult to correct Petzval sum and lateral chromatic aberration. Accordingly, a compound type aspherical surface having difference in refractive indices between glass substrate and the resin material with forming an aspherical surface on the glass substrate has not been proposed.

SUMMARY OF THE INVENTION

The present invention is made in view of the aforementioned problems and has an object to provide an aspherical lens having compactness in dimension, large degree of freedom in design, and good optical performance, with increasing in productivity, and lowering production cost.

A first aspect of the present invention provides an aspherical lens composed of a substrate member and a member having different composition formed on the substrate member, a boundary between the substrate member and the member having different composition being formed by a first aspherical surface, a surface of the member having different composition opposite to the boundary being formed by a second aspherical surface, and the following conditional expression (1) being satisfied:

$$0.05000 \leq |Na-Nb| \leq 0.50000 \quad (1)$$

where Na denotes refractive index of the medium of the substrate member at d-line ($\lambda$=587.56 nm), and Nb denotes refractive index of the medium of the member having different composition at d-line ($\lambda$=587.56 nm).

In one preferred embodiment of the present invention, the second aspherical surface preferably has higher fabrication accuracy than that of the first aspherical surface.

In one preferred embodiment of the present invention, the substrate member is preferably made of a glass material, a metallic material, or a resin material.

In one preferred embodiment of the present invention, the member having different composition is preferably made of a glass material or a resin material being different material from that of the substrate member.

In one preferred embodiment of the present invention, the member having different composition is preferably made of a resin material that is set by being irradiated with a light having a certain wavelength or with thermal energy.

In one preferred embodiment of the present invention, the following conditional expression (2) is preferably satisfied:

$$PV_{AB}/PV_B \leq 300 \quad (2)$$

where $PV_{AB}$ denotes PV value of a fabrication error relative to design value of the first aspherical surface, and $PV_B$ denotes PV value of a fabrication error relative to design value of the second aspherical surface.

In one preferred embodiment of the present invention, the design value of the first aspherical surface is preferably substantially the same as that of the second aspherical surface.

In one preferred embodiment of the present invention, the member having different composition is preferably formed with substantially the same thickness within the effective diameter of the lens.

In one preferred embodiment of the present invention, the aspherical lens has a negative paraxial focal length.

A second aspect of the present invention provides an aspherical lens composed of a substrate member and a member having different composition formed on the substrate member, a boundary between the substrate member and the member having different composition being formed by a first aspherical surface, and a surface of the member having different composition opposite to the boundary being formed by a second aspherical surface having higher fabrication accuracy than that of the first aspherical surface.

A third aspect of the present invention provides an optical instrument equipped with the aspherical lens according to claim 1.

Other features and advantages according to the invention will be readily understood from the detailed description of the preferred embodiment in conjunction with the accompanying drawings.

BRIEF DESCRIPTION OF THE DRAWINGS

FIGS. 3A and 3B are graphs showing degradation of MTF caused by lowering the contrast of a super wide-angle lens equipped with an aspherical lens according to Example 1 of the present invention relative to the image height from 0 mm to 14.2 mm at spatial frequency 30 (1/mm) upon focusing on infinity with full-open aperture, in which FIG. 3A shows MTF of the sagittal image plane and FIG. 3B shows MTF of the meridional image plane.

FIGS. 5A and 5B are graphs showing degradation of MTF caused by lowering the contrast of a zoom lens system equipped with an aspherical lens according to Example 2 of the present invention relative to the image height from 0 mm to 14.2 mm at spatial frequency 30 (1/mm) in the wide-angle end state upon focusing on infinity with full-open aperture, in which FIG. 5A shows MTF of the sagittal image plane (sagittal image shown in the graph) and FIG. 5B shows MTF of the meridional image plane (meridional image shown in the graph).

FIGS. 6A and 6B are graphs showing degradation of MTF caused by lowering the contrast of a zoom lens system equipped with an aspherical lens according to Example 2 of the present invention relative to the image height from 0 mm to 14.2 mm at spatial frequency 30 (1/mm) in the telephoto end state upon focusing on infinity with full-open aperture, in which FIG. 6A shows MTF of the sagittal image plane and FIG. 6B shows MTF of the meridional image plane.

FIGS. 8A and 8B are graphs showing degradation of MTF caused by lowering the contrast of a super wide-angle lens equipped with an aspherical lens according to Example 3 of the present invention relative to the image height from 0 mm to 14.2 mm at spatial frequency 30 (1/mm) upon focusing on infinity with full-open aperture, in which FIG. 8A shows MTF of the sagittal image plane (sagittal image in the graph) and FIG. 8B shows MTF of the meridional image plane (meridional image in the graph).

FIGS. 10A and 10B are graphs showing degradation of MTF caused by lowering the contrast of a super wide-angle lens equipped with an aspherical lens according to Example 4 of the present invention relative to the image height from 0 mm to 14.2 mm at spatial frequency 30 (1/mm) upon focusing on infinity with full-open aperture, in which FIG. 10A shows MTF of the sagittal image plane (sagittal image in the graph) and FIG. 10B shows MTF of the meridional image plane (meridional image in the graph).

DESCRIPTION OF THE MOST PREFERRED EMBODIMENTS

Figure 1:
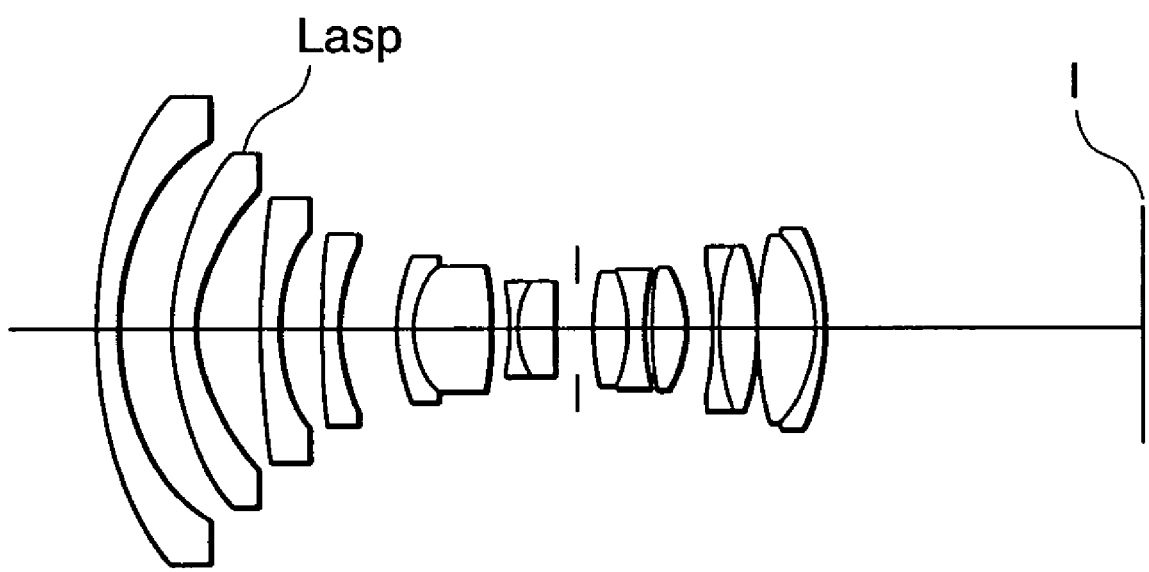
FIG. 1 is a diagram showing a lens construction of a super wide-angle lens equipped with an aspherical lens according to Example 1 of the present invention.

At first, a basic characteristic of an aspherical lens according to the present invention is explained.

The aspherical lens according to the present invention is composed of a substrate member such as a glass lens and the like, and a member having different composition from the substrate member such as a resin and the like formed on the substrate member. Hereinafter the substrate member is called as a "substrate member A", and the member having different composition from the substrate member is called as a "member B".

In the aspherical lens according to the present invention, a first aspherical surface having low precision which can be produced with no technical stress upon fabricating in large quantity is formed on a boundary surface of the substrate member A relative to the member B, in other words, the surface of the substrate member A and a second aspherical surface having higher precision than the first aspherical surface is formed on the member B opposite to the boundary of the member B.

In the aspherical lens in the present invention, the difference of refractive indices between the substrate member A and the member B is set to the optimum value as described later in detail. In this case, that the difference of refractive indices between the substrate member A and the member B can be set to a large value means that the degree of freedom in design can conspicuously be increased.

When the member B is formed to be substantially the same thickness, it becomes easy to form the second aspherical surface with high precision, so that variation in the shape caused by environmental variation such as temperature, humidity and the like becomes negligibly small. Accordingly, an aspherical lens with a large diameter capable of easily fabricating in a large quantity with relatively low cost but with high fabricating accuracy can be realized.

In order to optimally bring out the above-described effect, it is preferable that the aspherical lens according to the present invention is a so-called compound type aspherical lens made of glass and resin materials, in which an ultraviolet-setting resin or a thermo-setting resin having the second aspherical surface with high fabrication accuracy is formed on the glass substrate having the first aspherical surface with low fabrication accuracy processed by means of fine grinding or polishing.

Conditional expressions of the present invention are explained below.

In an aspherical lens according to the present invention composed of a substrate member and a member having different composition formed on the substrate member, a boundary between the substrate member and the member having different composition is formed by a first aspherical surface. A surface of the member having different composition opposite to the boundary is formed by a second aspherical surface having higher fabrication accuracy than that of the first aspherical surface. The following conditional expression (1) is satisfied:

$$0.05000 \leq |Na - Nb| \leq 0.50000 \tag{1}$$

where Na denotes refractive index of the medium of the substrate member at d-line ($\lambda$=587.56 nm), and Nb denotes refractive index of the medium of the member having different composition at d-line ($\lambda$=587.56 nm).

Conditional expression (1) is for optimally bringing out the above-described effect of increasing degree of freedom in design. When the value |Na−Nb| exceeds the upper limit of conditional expression (1), difference between refractive index Na of the substrate member A and refractive index Nb of the member B becomes excessively large, so that the limit of tolerance is exceeded. Accordingly, it becomes difficult to secure optical performance upon fabricating the aspherical lens in large quantity. On the other hand, when the substrate is formed with the aspherical surface with sufficient accuracy to secure optical performance in the excessively large difference in indices, fabrication cost becomes excessively large, so that there is not much point in applying the present invention.

When the upper limit of conditional expression (1) is set to 0.4, further high optical performance, increase in productivity, and a large cost reduction can be accomplished. Moreover, when the upper limit of conditional expression (1) is set to 0.3, the optimum effect of the present invention can be expected.

On the other hand, when the value |Na−Nb| falls below the lower limit of conditional expression (1), difference between refractive index Na of the substrate member A and refractive index Nb of the member B becomes excessively small. In this case, although accuracy of the aspherical surface formed on the substrate member A can be lowered, refractive index nd of the substrate member A cannot be made good use of a design parameter. As a result, basic design performance becomes low, so that it is undesirable.

As shown in the following respective examples, when an aspherical lens according to the present invention is applied to a so-called front negative lens disposed to the object side of a super wide-angle lens having a large angle of view or a super wide-angle zoom lens, in order to preferably correct Petzval sum, distortion, astigmatism, curvature of field, and the like, it is preferable in design that a glass material having refractive index nd of about 1.65 through 1.90 is used for the glass material of the front negative lens. When an ultraviolet-set resin is used for the member B, refractive index nd is about 1.4 through 1.55. Accordingly, when refractive indices of the substrate member A and the member B can be set within the range of conditional expression (1), it becomes possible to realize good optical performance, increase in productivity, reducing fabrication cost, and compactness of the optical system.

When the lower limit of conditional expression (1) is set to 0.1, further high optical performance, increase in productivity, drastic lightweight, and a large cost reduction can be accomplished. Moreover, when the lower limit of conditional expression (1) is set to 0.13, the optimum effect of the present invention can be expected. As shown later in the examples, in order to secure preferable optical performance, it is preferable to set the lower limit to these values.

As a substrate member A, a glass substrate, a resin substrate, and a metallic mirror can be applied. As a member B, a resin material, a super-low-melting glass, and the like can be applied.

As an aspherical lens fabrication method that makes an aspherical lens according to the present invention optimally bring out the effect, it is most suitable that a glass molding aspherical lens (corresponding to the substrate member A) is fabricated by a so-called direct press method with relatively low fabrication accuracy (corresponding to accuracy level of $PV_{AB}$ shown later in respective examples) and an ultraviolet-set resin or a thermo-set resin (corresponding to the member B) having an aspherical surface with high fabrication accuracy is formed on the glass molding aspherical lens. Alternatively, it is most suitable that an aspherical lens (corresponding to the substrate member A) is fabricated by means of so-called cutting and polishing with relatively low fabrication accuracy (corresponding to accuracy level of $PV_{AB}$ shown later in respective examples) and an ultraviolet-set resin or a thermo-set resin (corresponding to the member B) having an aspherical surface with high fabrication accuracy is formed similar to the above-described method.

Fabrication error of an aspherical surface is explained. Fabrication error of an aspherical surface is usually discussed dividing into figure error and shape accuracy. Figure error corresponds to the number of Newton's rings and is calculated such that an approximated aspherical surface is calculated from a fabricated aspherical surface and difference in refractive power between the approximated aspherical surface and a designed aspherical surface is corresponding to the figure error. Shape accuracy is the difference between the approximated aspherical surface and each measured value of the fabricated aspherical surface. PV value, which is a difference between a peak P value and a valley V value, means the maximum value of the shape accuracy. For example, in an aspherical lens fabricated by glass molding, the PV value becomes worse in proportional to the diameter of the lens. Generally, in an aspherical lens fabricated by glass molding having the diameter of about 40 mm to 60 mm, when the shape accuracy in PV value is about 0.1 μm level, it is necessary to apply a high-grade fabrication method. On the other hand, when the shape accuracy in PV value is about 1 μm to 10 μm level, an ordinary fabrication method can be easily applied at a low cost.

In an aspherical lens according to the present invention, the following conditional expression (2) is preferably satisfied:

$$PV_{AB}/PV_B \leq 300 \qquad (2)$$

where $PV_{AB}$ denotes fabrication error in PV value of the first aspherical surface relative to a design value, and $PV_B$ denotes fabrication error in PV value of the second aspherical surface relative to a design value.

Conditional expression (2) defines an appropriate range of fabrication error in PV value of the first aspherical surface formed on the substrate member A relative to that of the second aspherical surface formed on the member B in order to realize good optical performance, compactness of the optical system, increase in productivity, and reduction in fabrication cost all together.

When the ratio $PV_{AB}/PV_B$ exceeds the upper limit of conditional expression (2), shape accuracy of the aspherical surface formed on the substrate member A becomes extremely low, even if the glass material defined by conditional expression (1) is used, fabrication error of the aspherical surface formed on the substrate member A cannot be ignored.

When the upper limit of conditional expression (2) is set to 100, further increase in productivity, reduction of fabrication cost, and compactness of the optical system can be accomplished. Moreover, when the upper limit of conditional expression (2) is set to 80, the optimum effect of the present invention can be expected.

In an aspherical lens according to the present invention, it is preferable to set the lower limit of conditional expression (2) to 2 or more.

On the other hand, when the ratio $PV_{AB}/PV_B$ falls below the lower limit of conditional expression (2), the shape accuracy of the aspherical surface formed on the substrate member A becomes high. As described above, the purpose of the present invention is to realize good optical performance, compactness of the optical system, increase in productivity, and reduction in fabrication cost all together. However, that the shape accuracy of the aspherical surface formed on the substrate member A becomes high is undesirable because it loses the advantage of increase in productivity and reduction in fabrication cost.

When the lower limit of conditional expression (2) is set to 2.3 or more, further increase in productivity, and compactness of the optical system can be accomplished. When the lower limit of conditional expression (2) is set to 2.8 or more, the optimum effect of the present invention can be expected.

In an aspherical lens according to the present invention, it is preferable that the design value of the first aspherical surface formed on the substrate member A is approximately the same as that of the second aspherical surface formed on the member B. This means that the member B is formed with approximately the same thickness within the effective diameter of the lens, so that it becomes easy to be fabricated with high precision. Moreover, variation in the shape caused by environment change such as temperature, humidity, and the like becomes negligibly small, so that it becomes possible to easily increase the shape accuracy of the aspherical surface formed on the member B. Accordingly, it becomes possible to easily produce a large aspherical lens with high precision, and at a relatively low fabrication cost.

Furthermore, when the aspherical lens according to the present invention is constructed to have a negative paraxial focal length, the optimum effect of the present invention can be expected.

Each optical system equipped with an aspherical lens according to each Example of the present invention and an optical instrument using the optical system are explained below with reference to accompanying drawings.

EXAMPLE 1

Figure 2:
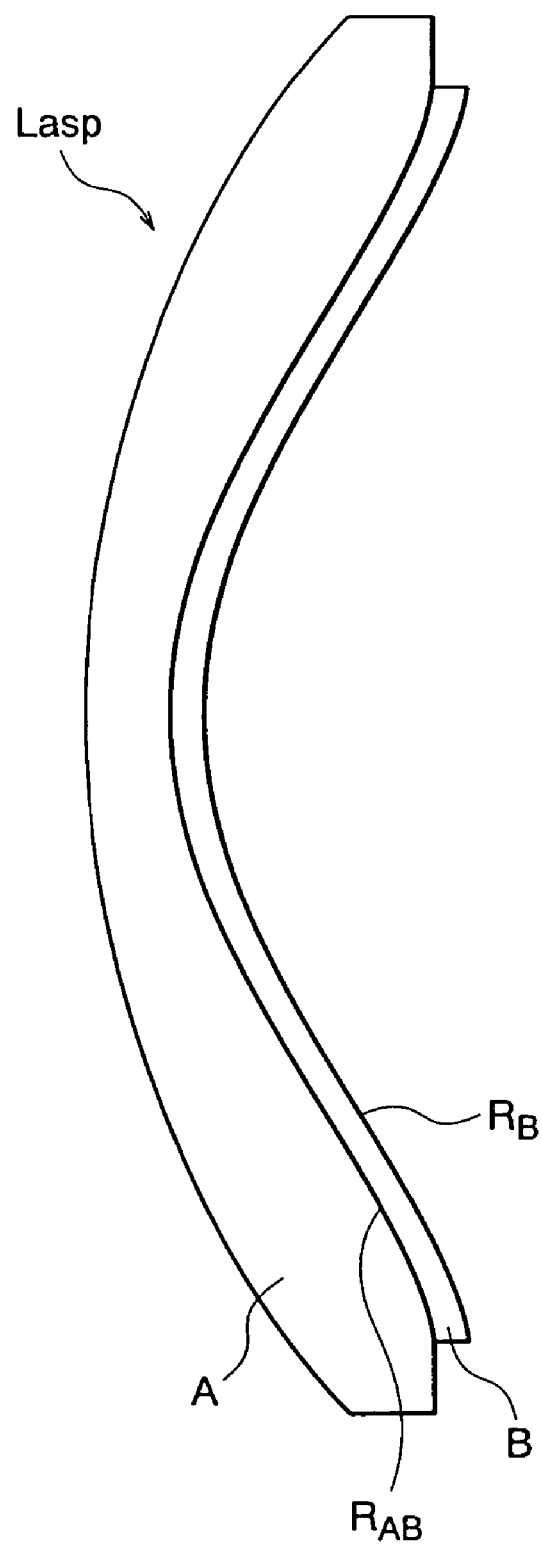
FIG. 2 schematically shows the aspherical lens according to the present invention.

FIG. 1 is a diagram showing a lens construction of a super wide-angle lens equipped with an aspherical lens according to Example 1 of the present invention. FIG. 2 schematically shows the aspherical lens according to the present invention.

In the super wide-angle lens shown in FIG. 1, the present invention is applied to the second lens element Lasp from the object side. As shown in FIG. 2, the lens element Lasp is composed of a compound type aspherical lens constructed by a negative meniscus lens A (substrate member A) having a convex surface facing to the object and an aspherical surface $R_{AB}$ with low fabrication accuracy formed on a concave surface, and a resin layer B (member B) having substantially the same thickness formed on the image side of the lens A having an aspherical surface $R_b$ with high fabrication accuracy facing to the image. Incidentally, the above-described construction of the lens Lasp is commonly used in each Example applying an aspherical lens according to the present invention.

Moreover, the fourth lens element from the object side is an ordinary compound type aspherical lens made of glass and resin materials.

Various values associated with a super wide-angle lens according to Example 1 are shown in Table 1.

In [Specifications], f denotes the focal length, 2ω denotes an angle of view (unit: degrees), and FNO denotes an f-number.

In [Lens Data], the first column shows the surface number that is a lens surface counted in order from the object, ri denotes the radius of curvature of the i-th lens surface Ri counted from the object side, di denotes a distance along the optical axis between the lens surface Ri and the lens surface Ri+1, vi denotes Abbe number of a medium between the lens surface Ri and the lens surface Ri+1 at d-line (λ=587.56 nm), and ni denote refractive index of a medium between the lens surface Ri and the lens surface Ri+1 at d-line (λ=587.56 nm). Bf denotes the back focal length. By the way, r=0.0000 denotes a plane surface. Refractive index for the air=1.000000 is omitted.

In each Example according to the present invention, aspherical coefficient is shown as the aspherical surface is expressed by the following expression:

$$S(y) = (y^2/R)/\{1 + (1 - \kappa y^2/R^2)^{1/2}\} + C3 \cdot |y|^3 + C4 \cdot y^4 + C6 \cdot y^6 + C8 \cdot y^8 + C10 \cdot y^{10} + C12 \cdot y^{12} + C14 \cdot y^{14} + A(1 - \cos(2\pi y/T))$$

where y denotes a height from the optical axis, S(y) denotes a distance (sag amount) along the optical axis from tangent lane at the vertex of the aspherical surface to the aspherical surface at the height y, R denotes a reference radius of curvature (a paraxial radius of curvature), K denotes a conical coefficient, and Cn denote n-th order aspherical coefficient, A denotes an amplitude of the shape accuracy of the aspherical surface, and T denotes a period of the shape accuracy.

In the aspherical expression, $A(1-\cos(2\pi y/T))$ is a term for simply evaluating the shape accuracy of the fabrication error of an aspherical surface by using a periodic function. In each Example of the present invention, the shape accuracy of the aspherical surface is generated by using this function and decrease in MTF (Modulation Transfer function) is discussed. "A" and "T" of the cosine function shown in [Lens Data] are terms for expressing the shape accuracy of the aspherical surface.

An aspherical surface is denoted by an asterisk (*) attached to the surface number. In [Aspherical Data], "E-n" denotes "$10^{-n}$".

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1

| [Specifications] | | | |
|---|---|---|---|
| f = | | | 9.6 |
| 2ω = | | | 112.9° |
| FNO = | | | 2.8 |

| [Lens Data] | | | |
|---|---|---|---|
| r | d | ν | n |
| 1) 46.021 | 3.00 | 42.72 | 1.83481 |

TABLE 1-continued

| | | | | | |
|---|---|---|---|---|---|
| 2) | 29.874 | 6.55 | | | |
| 3) | 33.500 | 2.47 | 49.52 | 1.74443 | |
| 4*) | 13.772 | 0.03 | 38.09 | 1.55389 | (Lasp) |
| 5*) | 13.772 | 8.50 | | | |
| 6) | 163.146 | 2.00 | 65.47 | 1.60300 | |
| 7) | 23.114 | 4.87 | | | |
| 8*) | 37.114 | 0.50 | 38.09 | 1.55389 | |
| 9) | 181.741 | 1.80 | 49.61 | 1.77250 | |
| 10) | 22.751 | 6.91 | | | |
| 11) | 25.470 | 1.80 | 42.72 | 1.83481 | |
| 12) | 11.762 | 9.47 | 34.47 | 1.63980 | |
| 13) | −33.113 | 2.05 | | | |
| 14) | −71.189 | 1.31 | 42.72 | 1.83481 | |
| 15) | 10.601 | 4.79 | 34.47 | 1.63980 | |
| 16) | −62.129 | 2.50 | | | |
| 17> | 0.000 | 2.50 | | Aperture Stop | |
| 18) | 54.894 | 4.07 | 41.42 | 1.57501 | |
| 19) | −13.690 | 2.00 | 42.72 | 1.83481 | |
| 20) | 37.498 | 0.53 | | | |
| 21) | 34.587 | 4.28 | 64.10 | 1.51680 | |
| 22) | −14.289 | 3.50 | | | |
| 23) | −58.212 | 0.80 | 42.72 | 1.83481 | |
| 24) | 29.361 | 4.99 | 82.52 | 1.49782 | |
| 25) | −24.803 | 0.10 | | | |
| 26) | 52.219 | 7.00 | 82.52 | 1.49782 | |
| 27) | −16.177 | 1.00 | 37.16 | 1.83400 | |
| 28) | −25.249 | 39.58 | | | |

[Aspherical Data]

Surface Number 4 (Lasp)

$\kappa = -0.5636$
$C4 = 7.84270E-06$
$C6 = -5.71790E-08$
$C8 = -1.74450E-10$
$C10 = 4.13950E-13$
Cosine function: $A = 0.0100$, $T = 17.99$ Surface Number 5

$\kappa = -0.5636$
$C4 = 7.84270E-06$
$C6 = -5.71790E-08$
$C8 = -1.74450E-10$
$C10 = 4.13950E-13$ Surface Number 8

$\kappa = -2.4604$
$C4 = -6.08040E-05$
$C6 = -3.80430E-08$
$C8 = -8.53170E-10$
$C10 = 6.47390E-12$

[Values for Conditional Expressions]

$PV_B=0.001$ (Decrease in MTF calculated by A=0.0005, T=16.5 is approximately the same as the latter case ($PV_{AB}=0.020$).)

$PV_{AB}=0.020$ (Decrease in MTF calculated by A=0.0100, T=16.5 is approximately the same as the former case ($PV_B=0.001$).)

$$Na-Nb=0.19054 \quad (1)$$

$$PV_{AB}/PV_B=20.0 \quad (2)$$

Here, the following explanation is the result of the simulation in which the shape accuracy of the aspherical surface is generated.

Figure 3A:
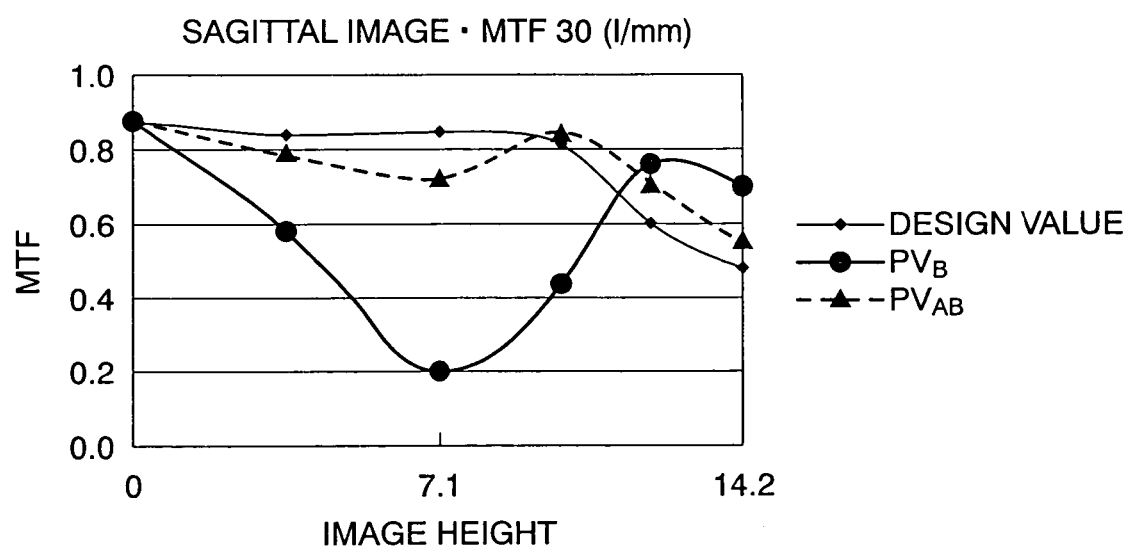
Figure 3B:
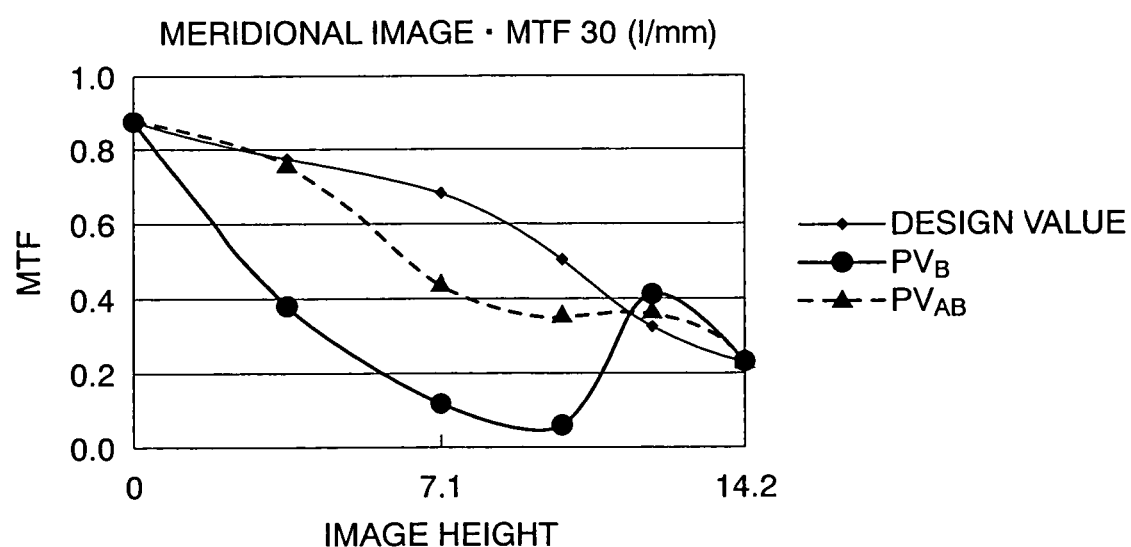

FIGS. 3A and 3B are graphs showing degradation of MTF caused by lowering the contrast of a super wide-angle lens equipped with an aspherical lens according to Example 1 of the present invention relative to the image height from 0 mm to 14.2 mm at spatial frequency 30 (1/mm) upon focusing on infinity with full-open aperture, in which FIG. 3A shows MTF of the sagittal image plane and FIG. 3B shows MTF of the meridional image plane.

In each graph, design value shows the designed MTF value in the state where the above-described periodic function $A(1-\cos(2\pi y/T))$ does not exist, in other words, no fabrication error does exist.

In each graph, $PV_{AB}$ shows the MTF value in the case where the fabrication error corresponding to the periodic function $A(1-\cos(2\pi y/T))$ is generated on the aspherical surface $R_{AB}$ formed on the negative meniscus lens A.

In each graph, $PV_B$ shows the MTF value in the case where the compound type aspherical lens constructed by a glass material and a resin material is replaced by a glass aspherical lens having the same aspherical surface as that of the compound type aspherical surface and the amount of the fabrication error corresponding to the periodic function $A(1-\cos(2\pi y/T))$ is generated on the aspherical surface.

In this case, when the difference in refractive indices is about Na−Nb=0.19054, it is shown that the tolerance of fabrication error in the amplitude A is about 10 μm. Accordingly, the tolerance of shape accuracy in PV value is about 20 μm. As is apparent from the result of the simulations shown in FIGS. 3A and 3B, it can easily be confirmed that the present invention has enormous effect.

EXAMPLE 2

Figure 4:
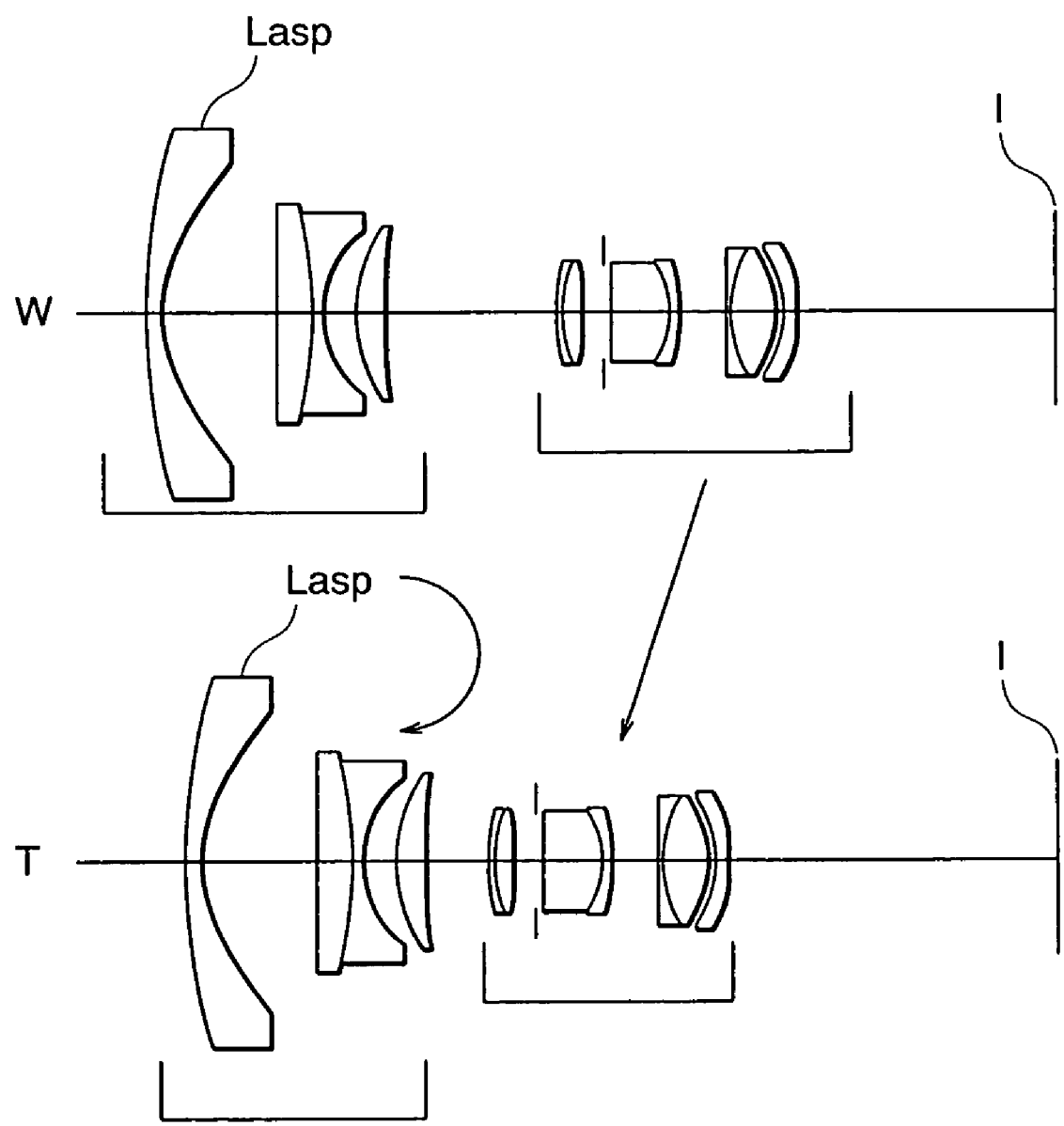
FIG. 4 is a diagram showing lens construction of a zoom lens system equipped with an aspherical lens according to Example 2 of the present invention together with a moving trajectory of each lens group upon zooming.

FIG. 4 is a diagram showing lens construction of a zoom lens system equipped with an aspherical lens according to Example 2 of the present invention together with a moving trajectory of each lens group upon zooming.

As shown in FIG. 4, the zoom lens system according to Example 2 of the present invention is a so-called negative-positive two-group zoom lens composed of, in order from an object, a negative lens group and a positive lens group. In Example 2, an aspherical surface is included in the most object side lens, the third lens from object side that is a compound type aspherical lens constructed by a glass material and a resin material, and the most image side lens that is a glass aspherical lens. In Example 2, the present invention is applied to the most object side lens Lasp.

Various values associated with a zoom lens system equipped with an aspherical lens according to Example 2 of the present invention are shown in Table 2.

TABLE 2

| [Specifications] | | |
|---|---|---|
| | W | T |
| f = | 12.3 | 23.3 |
| 2ω = | 98.8° | 62.0° |
| FNO = | 4 | |

| [Lens Data] | | | | |
|---|---|---|---|---|
| | r | d | ν | n |
| 1*) | 78.092 | 2.00 | 49.55 | 1.74443 |
| 2*) | 19.627 | 0.03 | 38.09 | 1.55389 (Lasp) |
| 3*) | 19.627 | 16.65 | | |
| 4) | 242.623 | 5.00 | 40.75 | 1.58144 |
| 5) | −65.892 | 1.50 | 49.61 | 1.77250 |
| 6) | 16.100 | 0.10 | 38.09 | 1.55389 |
| 7*) | 16.226 | 4.80 | | |
| 8) | 23.329 | 4.00 | 27.51 | 1.75520 |
| 9) | 94.104 | d9 | | |
| 10) | 30.681 | 0.90 | 52.67 | 1.74100 |

TABLE 2-continued

| | | | | |
|---|---|---|---|---|
| 11) | 16.891 | 3.00 | 45.79 | 1.54814 |
| 12) | −82.956 | 3.43 | | |
| 13> | 0.000 | 1.00 | | Aperture Stop |
| 14) | −4845.745 | 9.00 | 82.52 | 1.49782 |
| 15) | −11.960 | 1.35 | 46.58 | 1.80400 |
| 16) | −24.952 | 6.95 | | |
| 17) | 774.899 | 0.90 | 39.59 | 1.80440 |
| 18) | 20.088 | 6.50 | 82.52 | 1.49782 |
| 19) | −15.314 | 1.00 | | |
| 20*) | −19.829 | 2.00 | 57.44 | 1.60602 |
| 21*) | −23.826 | Bf | | |

[Aspherical Data]

Surface Number 1

κ = −13.9624
C4 = 7.03860E−07
C6 = 1.23420E−10
C8 = 2.35070E−13
C10 = 4.78750E−16
C12 = 0.13662E−18
Surface Number 2 (Lasp)

κ = −0.6055
C3 = 0.26968E−04
C4 = −4.77700E−06
C6 = −3.12450E−09
C8 = 1.23680E−12
C10 = 3.39710E−15
C12 = 0.16057E−16
C14 = 0.41171E−20
Cosine function: A = 0.010, T = 21.82
Surface Number 3

κ = −0.6055
C3 = 0.26968E−04
C4 = −4.77700E−06
C6 = −3.12450E−09
C8 = 1.23680E−12
C10 = 3.39710E−15
C12 = 0.16057E−16
C14 = 0.41171E−20
Surface Number 7

κ = 0.3414
C3 = 0.25582E−04
C4 = 3.67940E−05
C6 = −6.97010E−08
C8 = 7.16180E−10
C10 = −3.18200E−12
C12 = 0.19011E−16
C14 = 0.32012E−17
Surface Number 20

κ = 1.4732
C3 = 0.37935E−05
C4 = −3.87640E−06
C6 = −6.02020E−08
C8 = −9.02410E−10
C10 = −1.90620E−12
Surface Number 21

κ = 0.6403
C3 = −0.81158E−06
C4 = −1.91950E−06
C6 = −7.62310E−08
C8 = −3.70540E−10
C10 = −4.03920E−12

[Variable Distances]

| | W | M | T |
|---|---|---|---|
| f = | 12.300 | 18.000 | 23.300 |
| d9 = | 25.878 | 9.804 | 1.914 |
| Bf = | 37.966 | 48.367 | 58.026 |

[Values for Conditional Expressions]

$PV_B$=0.001 (Decrease in MTF calculated by A=0.0005, T=18.0 is approximately the same as the latter case ($PV_{AB}$=0.004).)

$PV_{AB}$=0.004 (Decrease in MTF calculated by A=0.0020, T=18.0 is approximately the same as the former case ($PV_B$=0.001).)

$$Na-Nb=0.19054 \tag{1}$$

$$PV_{AB}/PV_B=4.0 \tag{2}$$

Here, the following explanation is the result of the simulation in which the shape accuracy of the aspherical surface is generated.

Figure 5A:
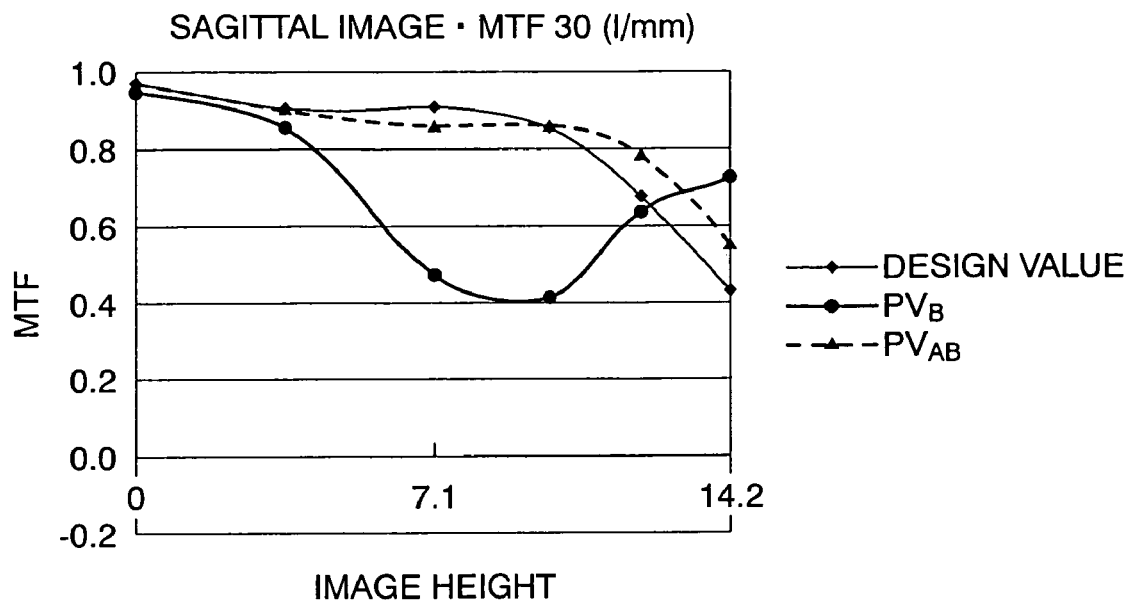
Figure 5B:
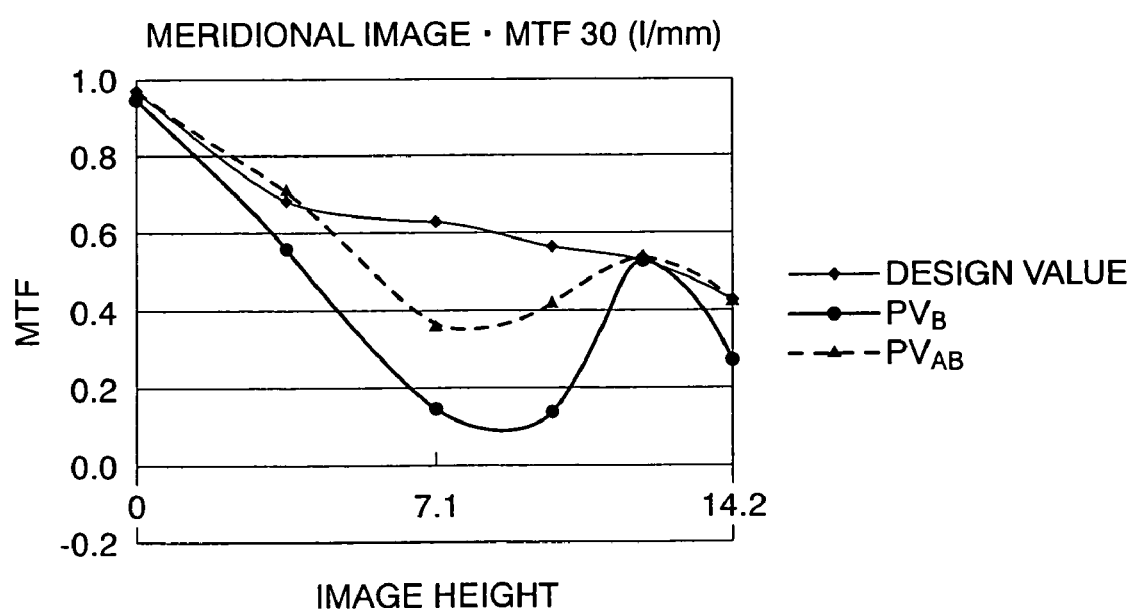

FIGS. 5A and 5B are graphs showing degradation of MTF caused by lowering the contrast of a zoom lens system equipped with an aspherical lens according to Example 2 of the present invention relative to the image height from 0 mm to 14.2 mm at spatial frequency 30 (1/mm) in the wide-angle end state upon focusing on infinity with full-open aperture, in which FIG. 5A shows MTF of the sagittal image plane (sagittal image shown in the graph) and FIG. 5B shows MTF of the meridional image plane (meridional image shown in the graph).

Figure 6A:
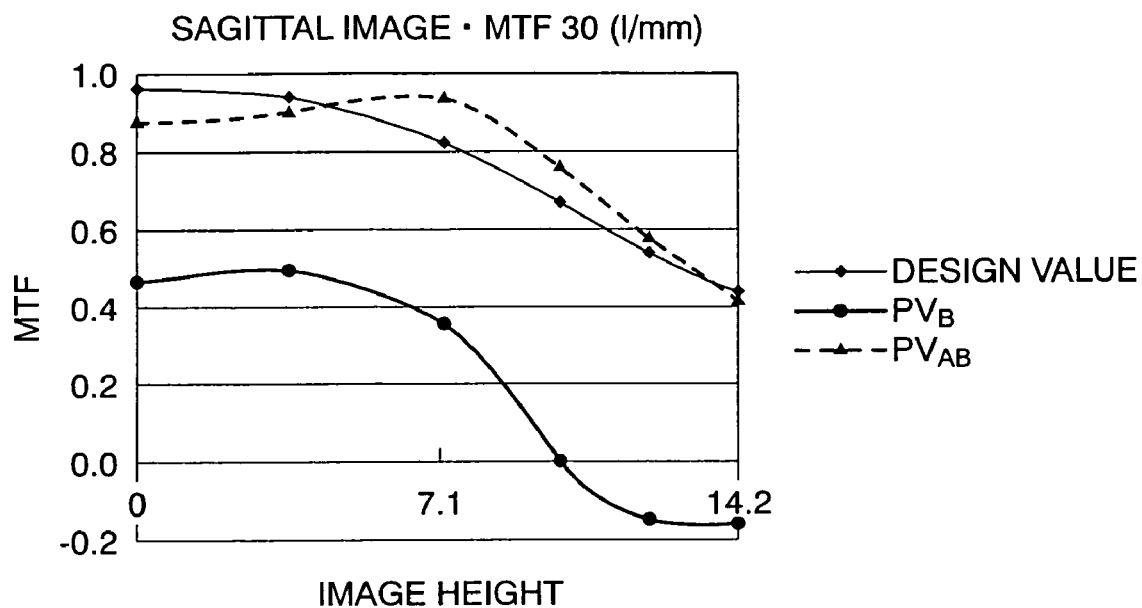
Figure 6B:
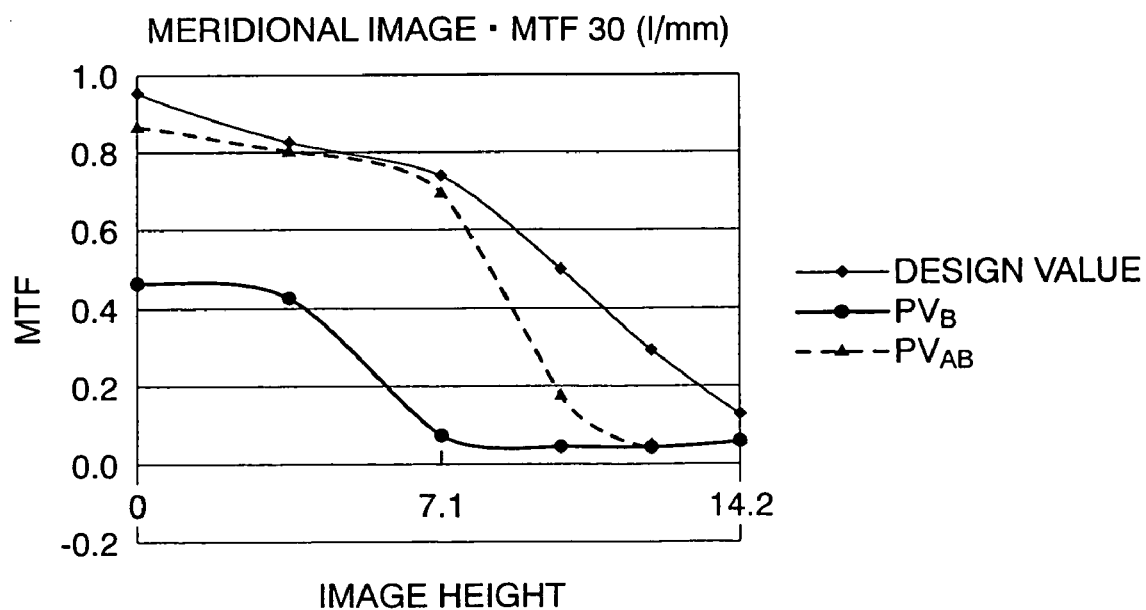

FIGS. 6A and 6B are graphs showing degradation of MTF caused by lowering the contrast of a zoom lens system equipped with an aspherical lens according to Example 2 of the present invention relative to the image height from 0 mm to 14.2 mm at spatial frequency 30 (1/mm) in the telephoto end state upon focusing on infinity with full-open aperture, in which FIG. 6A shows MTF of the sagittal image plane and FIG. 6B shows MTF of the meridional image plane.

In this case, when the difference in refractive indices is about Na−Nb=0.19054, it is shown that the tolerance of fabrication error in the amplitude A is about 10 μm. Accordingly, the tolerance of shape accuracy is obviously mitigated. As is apparent from the result of the simulations shown in FIGS. 5A, 5B, 6A, and 6B, it can easily be confirmed that the present invention has enormous effect.

EXAMPLE 3

Figure 7:
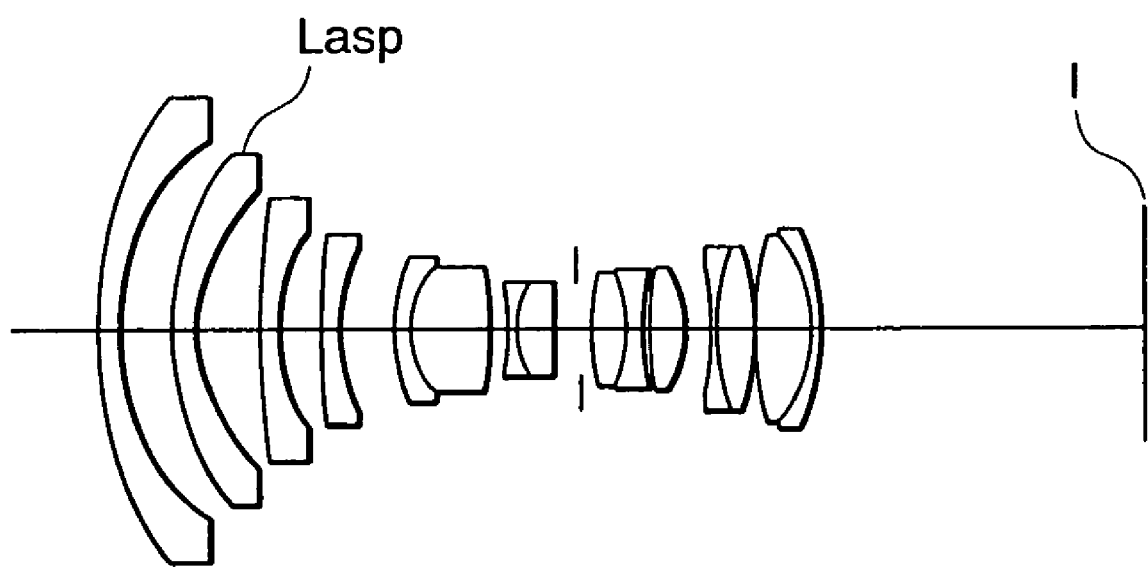
FIG. 7 is a diagram showing a lens construction of a super wide-angle lens equipped with an aspherical lens according to Example 3 of the present invention.

FIG. 7 is a diagram showing a lens construction of a super wide-angle lens equipped with an aspherical lens according to Example 3 of the present invention.

The super wide-angle lens shown in FIG. 7 has basically the same construction as the super wide-angle lens according to Example 1 and the present invention is applied to the second lens Lasp from the object side.

Various values associated with a super wide-angle lens equipped with an aspherical lens according to Example 3 of the present invention are shown in Table 3.

TABLE 3

| [Specifications] | | | |
|---|---|---|---|
| f = | | | 9.6 |
| 2ω = | | | 112.9° |
| FNO = | | | 2.8 |

| [Lens Data] | | | | |
|---|---|---|---|---|
| | r | d | ν | n |
| 1) | 46.0209 | 3.00 | 42.72 | 1.83481 |
| 2) | 29.8742 | 6.55 | | |
| 3) | 33.4995 | 2.47 | 49.52 | 1.74443 |
| 4*) | 13.7722 | 0.03 | 53.22 | 1.69350 (Lasp) |

TABLE 3-continued

| | | | | |
|---|---|---|---|---|
| 5*) | 13.7722 | 8.50 | | |
| 6) | 163.1457 | 2.00 | 65.47 | 1.60300 |
| 7) | 23.1139 | 4.87 | | |
| 8*) | 37.1136 | 0.50 | 38.09 | 1.55389 |
| 9) | 181.7413 | 1.80 | 49.61 | 1.77250 |
| 10) | 22.7507 | 6.91 | | |
| 11) | 25.4702 | 1.80 | 42.72 | 1.83481 |
| 12) | 11.7615 | 9.47 | 34.47 | 1.63980 |
| 13) | −33.1129 | 2.05 | | |
| 14) | −71.1891 | 1.31 | 42.72 | 1.83481 |
| 15) | 10.6009 | 4.79 | 34.47 | 1.63980 |
| 16) | −62.1288 | 2.50 | | |
| 17> | 0.0000 | 2.50 | | Aperture Stop |
| 18) | 54.8944 | 4.07 | 41.42 | 1.57501 |
| 19) | −13.6904 | 2.00 | 42.72 | 1.83481 |
| 20) | 37.4980 | 0.53 | | |
| 21) | 34.5873 | 4.28 | 64.10 | 1.51680 |
| 22) | −14.2889 | 3.50 | | |
| 23) | −58.2123 | 0.80 | 42.72 | 1.83481 |
| 24) | 29.3607 | 4.99 | 82.52 | 1.49782 |
| 25) | −24.8031 | 0.10 | | |
| 26) | 52.2185 | 7.00 | 82.52 | 1.49782 |
| 27) | −16.1773 | 1.00 | 37.16 | 1.83400 |
| 28) | −25.2494 | 39.58 | | |

[Aspherical Data]

Surface Number 4 (Lasp)

κ = −0.5636
C4 = 7.84270E−06
C6 = −5.71790E−08
C8 = −1.74450E−10
C10 = 4.13950E−13
Cosine function: A = 0.010, T = 17.99
Surface Number 5

κ = −0.5636
C4 = 7.84270E−06
C6 = −5.71790E−08
C8 = −1.74450E−10
C10 = 4.13950E−13
Surface Number 8

κ = −2.4604
C4 = −6.08040E−05
C6 = −3.80430E−08
C8 = −8.53170E−10
C10 = 6.47390E−12

[Values for Conditional Expressions]

$PV_B$=0.001 (Decrease in MTF calculated by A=0.0005, T=16.5 is approximately the same as the latter case ($PV_{AB}$=0.040).)

$PV_{AB}$=0.040 (Decrease in MTF calculated by A=0.0200, T=16.5 is approximately the same as the former case ($PV_B$=0.001).)

$$Na-Nb=0.05093 \quad (1)$$

$$PV_{AB}/PV_B=40.0 \quad (2)$$

Here, the following explanation is the result of the simulation in which the shape accuracy of the aspherical surface is generated.

Figure 8A:
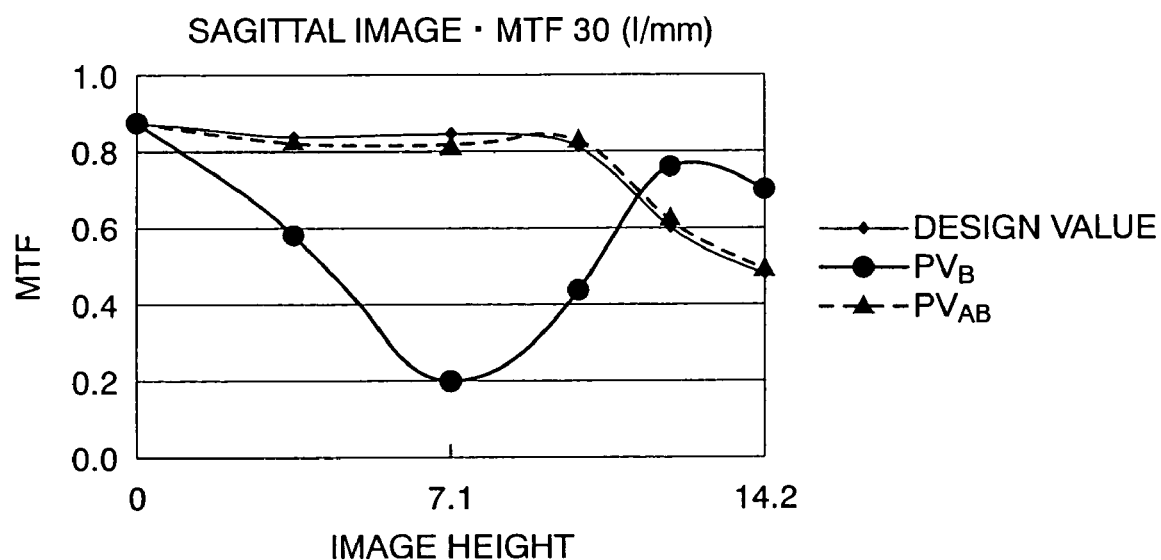
Figure 8B:
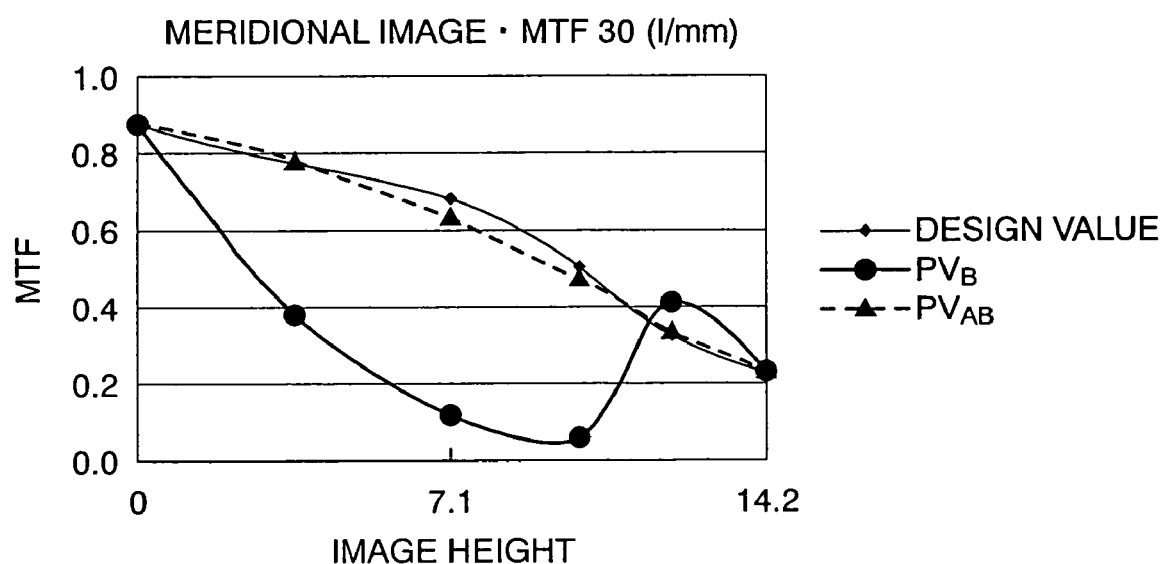

FIGS. 8A and 8B are graphs showing degradation of MTF caused by lowering the contrast of a super wide-angle lens equipped with an aspherical lens according to Example 3 of the present invention relative to the image height from 0 mm to 14.2 mm at spatial frequency 30 (1/mm) upon focusing on infinity with full-open aperture, in which FIG. 8A shows MTF of the sagittal image plane (sagittal image in the graph) and FIG. 8B shows MTF of the meridional image plane (meridional image in the graph).

In Example 3, simulation is carried out in the case where the difference in refractive indices Na−Nb=0.05093 is small. In such difference in refractive indices, it is obvious that the effect of the present invention mitigates tolerance of the aspherical surface. In the difference in refractive indices Na−Nb=0.05093, it is understood that the fabrication error of about amplitude A=10 μm may not be recognized as a fabrication error. Accordingly, tolerance of the shape accuracy may further exceed PV value of 20 μm. It is understood by the further simulation that fabrication error of about amplitude A=20 to 50 μm is also permissible. As is apparent from the result of the simulations shown in FIGS. 8A and 8B, it can easily be confirmed that the present invention has enormous effect.

EXAMPLE 4

Figure 9:
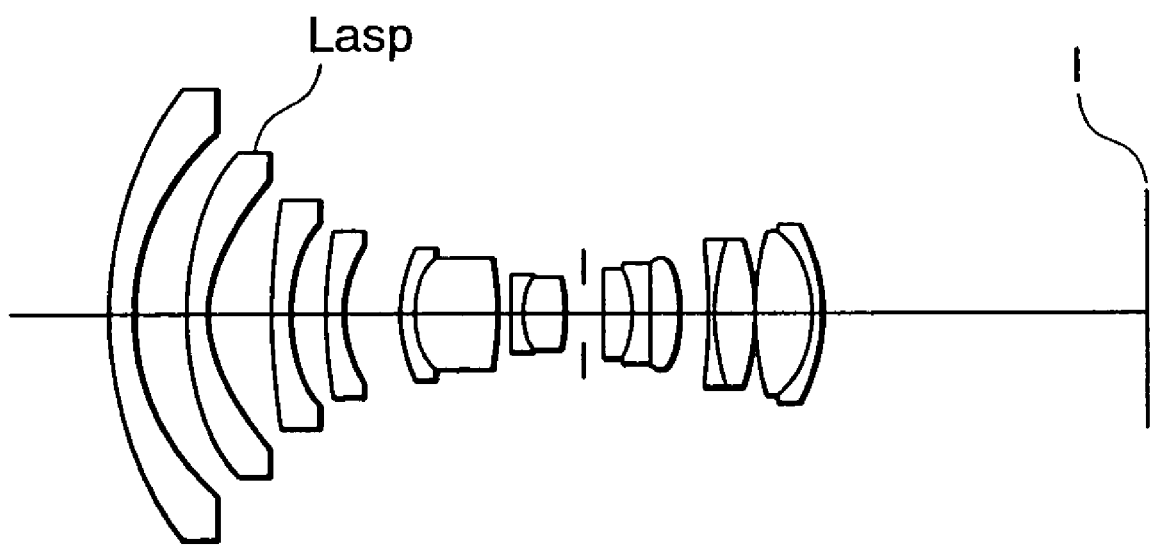
FIG. 9 is a diagram showing a lens construction of a super wide-angle lens equipped with an aspherical lens according to Example 4 of the present invention.

FIG. 9 is a diagram showing a lens construction of a super wide-angle lens equipped with an aspherical lens according to Example 4 of the present invention.

The super wide-angle lens shown in FIG. 9 has basically the same construction as the super wide-angle lens according to Example 1 and the present invention is applied to the second lens Lasp from the object side.

Various values associated with a super wide-angle lens equipped with an aspherical lens according to Example 4 of the present invention are shown in Table 4.

TABLE 4

[Specifications]

| | |
|---|---|
| f = | 9.6 |
| 2ω = | 112.9° |
| FNO = | 3.5 |

[Lens Data]

| | r | d | ν | n | |
|---|---|---|---|---|---|
| 1) | 46.0209 | 3.00 | 42.72 | 1.83481 | |
| 2) | 29.8742 | 6.55 | | | |
| 3) | 33.4123 | 2.47 | 40.77 | 1.88300 | |
| 4*) | 13.7860 | 0.03 | 65.77 | 1.46450 | (Lasp) |
| 5*) | 13.7860 | 8.50 | | | |
| 6) | 83.4384 | 2.00 | 65.47 | 1.60300 | |
| 7) | 21.3241 | 4.10 | | | |
| 8*) | 31.4137 | 0.50 | 38.09 | 1.55389 | |
| 9) | 76.9429 | 1.80 | 49.61 | 1.77250 | |
| 10) | 17.7035 | 6.91 | | | |
| 11) | 17.2603 | 1.80 | 42.72 | 1.83481 | |
| 12) | 11.1396 | 9.47 | 34.47 | 1.63980 | |
| 13) | −69.6428 | 2.05 | | | |
| 14) | −1066.2089 | 1.31 | 42.72 | 1.83481 | |
| 15) | 9.7677 | 4.79 | 34.47 | 1.63980 | |
| 16) | −83.7543 | 2.50 | | | |
| 17> | 0.0000 | 2.50 | | Aperture Stop | |
| 18) | 450.6969 | 3.79 | 41.42 | 1.57501 | |
| 19) | −11.7053 | 2.00 | 42.72 | 1.83481 | |
| 20) | 46.2041 | 0.10 | | | |
| 21) | 32.1479 | 3.76 | 64.10 | 1.51680 | |
| 22) | −15.2302 | 3.50 | | | |
| 23) | −54.4190 | 0.80 | 42.72 | 1.83481 | |
| 24) | 28.7972 | 5.16 | 82.52 | 1.49782 | |
| 25) | −22.8428 | 0.10 | | | |
| 26) | 47.6630 | 7.00 | 82.52 | 1.49782 | |
| 27) | −14.7956 | 1.00 | 37.16 | 1.83400 | |
| 28) | −21.5250 | 39.62 | | | |

[Aspherical Data]

Surface Number 4 (Lasp)

κ = −0.5636
C4 = 8.07120E−06

TABLE 4-continued

```
C6 = −2.49050E−08
C8 = −1.79540E−10
C10 = 2.63530E−13
Cosine function: A = 0.010, T = 16.48000
Surface Number 5

κ = −0.5636
C4 = 8.07120E−06
C6 = −2.49050E−08
C8 = −1.79540E−10
C10 = 2.63530E−13
Surface Number 8

κ = −2.4604
C4 = −5.18800E−05
C6 = −8.90140E−08
C8 = −3.13960E−13
C10 = −2.56520E−13
```

[Values for Conditional Expressions]

$PV_B$=0.001 (Decrease in MTF calculated by A=0.0005, T=16.5 is approximately the same as the latter case ($PV_{AB}$=0.003).)

$PV_{AB}$=0.003 (Decrease in MTF calculated by A=0.0015, T=16.5 is approximately the same as the former case ($PV_B$=0.001).)

$$Na-Nb=0.4185 \quad (1)$$

$$PV_{AB}/PV_B=3.0 \quad (2)$$

Here, the following explanation is the result of the simulation in which the shape accuracy of the aspherical surface is generated.

Figure 10A:
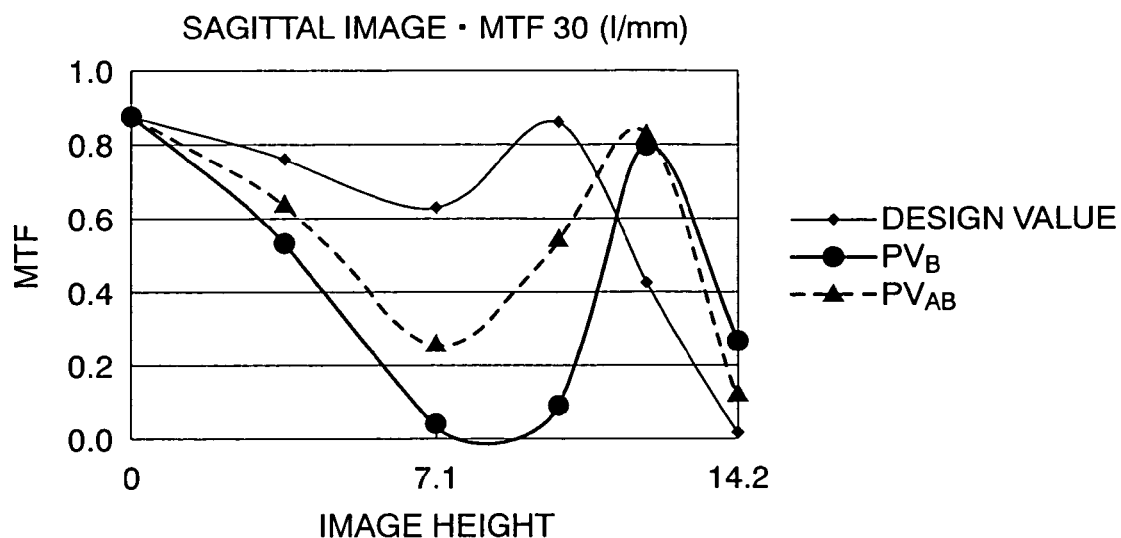
Figure 10B:
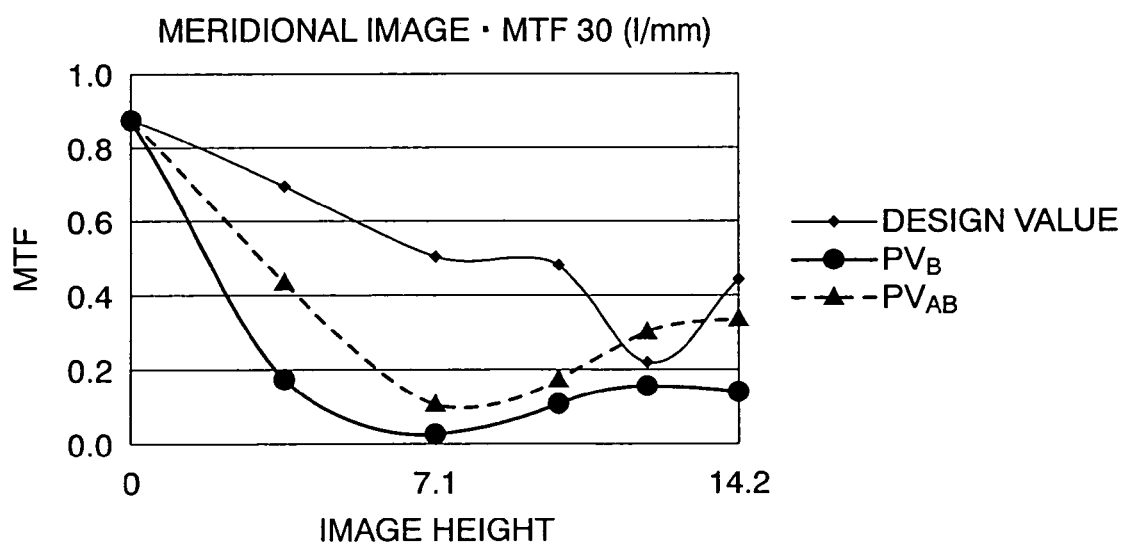

FIGS. 10A and 10B are graphs showing degradation of MTF caused by lowering the contrast of a super wide-angle lens equipped with an aspherical lens according to Example 4 of the present invention relative to the image height from 0 mm to 14.2 mm at spatial frequency 30 (1/mm) upon focusing on infinity with full-open aperture, in which FIG. 10A shows MTF of the sagittal image plane (sagittal image in the graph) and FIG. 10B shows MTF of the meridional image plane (meridional image in the graph).

In Example 4, simulation is carried out in the case where the difference in refractive indices Na−Nb=0.41845 is extremely large. In such difference in refractive indices, although degradation of MTF is recognized, there are optical systems acceptable with this MTF value level. It should be noted that even if fabrication error is about amplitude A=10 μm, the sensitivity of an aspherical lens according to the present invention to the fabrication error is much lower than that of a glass aspherical lens having the same amount of fabrication error, in other words, it means tolerance is broad. As is apparent from the result of the simulations shown in FIGS. 10A and 10B, it can easily be confirmed that the present invention has enormous effect.

It is needless to say that by using each Example any simulation using parameters other than the above-described ones can be carried out by freely changing parameters T and A of the aspherical expression.

In the above-described conditional expression (2), PV value of the fabrication tolerance ($PV_{AB}$ or $PV_B$) is derived from the simulation by using any but the same value of the parameter T and by varying the parameter A so that the degradation value of MTF at a given image height in a given focal length state becomes a given value. Moreover, in consideration of the fabrication error level (threshold limit value of fabrication) of an ordinary compound type aspherical lens, conditional expression (2) is determined.

Incidentally, in the simulation of the aspherical lens according to the present invention, a white light weight is used for calculating MTF values. Accordingly, it is needless to say that value for conditional expression (2) varies according to the way to determine the fabrication tolerance.

As described above, each example of the present invention makes it possible to realize an aspherical lens having compactness in dimension, large degree of freedom in design, and good optical performance, with increasing in productivity, and lowering production cost. By applying the aspherical lens in an optical system of a super wide-angle lens or a zoom lens, the whole optical system can be compact.

Figure 11:
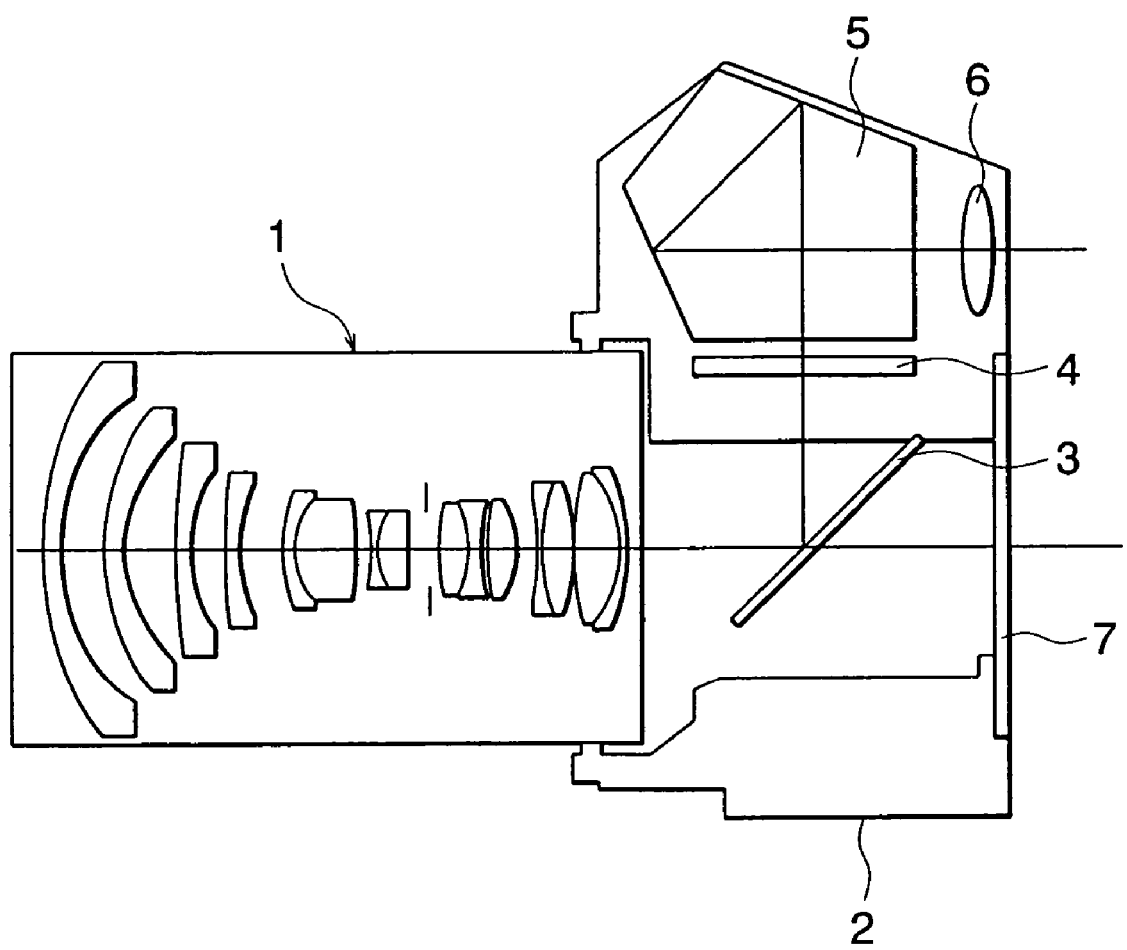
FIG. 11 is a diagram showing a construction of a single-lens-reflex camera equipped with the super wide-angle lens according to Example 1 of the present invention.

Then a single-lens-reflex camera equipped with the super wide-angle lens according to Example 1 of the present invention is explained. FIG. 11 is a diagram showing a construction of a single-lens-reflex camera equipped with the super wide-angle lens according to Example 1 of the present invention.

As shown in FIG. 11, the single-lens-reflex camera is equipped with the super wide-angle lens according to Example 1 as a shooting lens 1 in a camera body 2. In the camera body 2, in order from an object (not shown), a mirror 3, a focusing screen 4, a prism 5, and an eyepiece 6 are disposed as a viewfinder optical system through the shooting lens 1 and an imaging device 7 is disposed behind the mirror 3.

In the above-described construction, upon observing an object, the light from the object is incident to an eye of an observer through the shooting lens 1, the mirror 3, the focusing screen 4, the prism 5, and the eyepiece 6. Upon shooting, the mirror 3 is moved out of the optical path and the object light is led to the imaging device 6 to shoot the object.

In this case, although a super wide-angle lens according to Example 1 is used as a shooting lens, it is needless to say that any zoom lens or a super wide-angle lens according to each example can be used.

As described above, the present invention makes it possible to realize a single-lens-reflex camera equipped with an aspherical lens having compactness in dimension, large degree of freedom in design, and good optical performance, with increasing in productivity, and lowering production cost.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An aspherical lens comprising:
a substrate member,
a member having a different composition from the substrate member and being formed on the substrate member,
a boundary surface between the substrate member and the member having the different composition being formed by a first aspherical surface,
a surface of the member having the different composition opposite to the boundary surface being formed by a second aspherical surface,
a refractive index of a medium of the substrate member at d-line in which λ=587.56 nm is higher than a refractive index of a medium of the member having the different composition at d-line in which λ=587.56 nm, a thickness of a center portion of the substrate member is larger than that of the member having the different composition, and the following conditional expressions being satisfied:

$$0.05000 \leq |Na-Nb| \leq 0.50000$$

$$2.3 \leq PV_{AB}/PV_B \leq 100$$

where Na denotes the refractive index of the medium of the substrate member at d-line in which λ=587.56 nm, and Nb denotes the refractive index of the medium of the member having the different composition at d-line in which λ=587.56 nm, $PV_{AB}$ denotes PV value of a fabrication error relative to design value of the first aspherical surface, and $PV_B$ denotes PV value of a fabrication error relative to design value of the second aspherical surface.

2. The aspherical lens according to claim 1, wherein the second aspherical surface has higher fabrication accuracy than that of the first aspherical surface.

3. The aspherical lens according to claim 2, wherein the substrate member is made of a glass material, a metallic material, or a resin material.

4. The aspherical lens according to claim 3, wherein the member having different composition is made of a glass material or a resin material being different material from that of the substrate member.

5. The aspherical lens according to claim 4, wherein the member having different composition is made of a resin material that is set by being irradiated with a light having a certain wavelength or with thermal energy.

6. The aspherical lens according to claim 5, wherein the following conditional expression is satisfied:

$$2.8 PV_{AB}/PV_B \leq 80.$$

7. The aspherical lens according to claim 2, wherein the member having different composition is made of a glass material or a resin material being different material from that of the substrate member.

8. The aspherical lens according to claim 2, wherein the member having different composition is made of a resin material that is set by being irradiated with a light having a certain wavelength or with thermal energy.

9. The aspherical lens according to claim 2, wherein the following conditional expression is satisfied:

$$3.0 \leq PV_{AB}/PV_B \leq 40.$$

10. The aspherical lens according to claim 1, wherein the substrate member is made of a glass material, a metallic material, or a resin material.

11. The aspherical lens according to claim 1, wherein the member having different composition is made of a glass material or a resin material being different material from that of the substrate member.

12. The aspherical lens according to claim 1, wherein the member having different composition is made of a resin material that is set by being irradiated with a light having a certain wavelength or with thermal energy.

13. The aspherical lens according to claim 1, wherein the following conditional expression is satisfied:

$$2.3 \leq PV_{AB}/PV_B \leq 80.$$

14. The aspherical lens according to claim 1, wherein design value of the first aspherical surface is substantially the same as that of the second aspherical surface.

15. The aspherical lens according to claim 1, wherein the member having different composition is formed with substantially the same thickness within the effective diameter of the lens.

16. The aspherical lens according to claim 1, wherein the aspherical lens has a negative paraxial focal length.

17. An optical instrument equipped with the aspherical lens according to claim 1.

18. An aspherical lens comprising:

a substrate member, a member having a different composition from the substrate member and being formed on the substrate member, a boundary surface between the substrate member and the member having the different composition being formed by a first aspherical surface, a surface of the member having the different composition opposite to the boundary surface being formed by a second aspherical surface having higher fabrication accuracy than that of the first aspherical surface, and the following conditional expression being satisfied:

$$2.3 \leq PV_{AB}/PV_B \leq 100$$

where $PV_{AB}$ denotes PV value of a fabrication error relative to design value of the first aspherical surface, and $PV_B$ denotes PV value of a fabrication error relative to design value of the second aspherical surface.

19. An aspherical lens comprising:

a substrate member;

a member having a different composition from the substrate member and being formed on the substrate member;

a boundary surface between the substrate member and the member having the different composition being formed by a first aspherical surface;

a surface of the member having the different composition opposite to the boundary surface being formed by a second aspherical surface;

a refractive index of a medium of the substrate member at d-line in which λ=587.56 nm is higher than a refractive index of a medium of the member having the different composition at d-line in which λ=587.56 nm;

the following conditional expression being satisfied:

$$0.4185 \leq |Na-Nb| \leq 0.50000$$

where Na denotes the refractive index of the medium of the substrate member at d-line in which λ=587.56 nm, and Nb denotes the refractive index of the medium of the member having the different composition at d-line in which λ=587.56 nm.

20. The aspherical lens according to claim 1, wherein the substrate member is formed into a meniscus shape.

21. The aspherical lens according to claim 1, wherein white light from an object passes through the aspherical lens.

22. A single-lens-reflex camera system comprising:

a camera body; and a lens system having an aspherical lens according to claim 1.

23. A camera lens system equipped with the aspherical lens according to claim 1.

24. The camera lens system according to claim 23, wherein the camera lens system is a zoom lens system.

25. The camera lens system according to claim 23, wherein the camera lens system comprises, in order from an object, a first lens group and a second lens group.

26. The camera lens system according to claim 25, wherein the first lens group has the aspherical lens.

27. The camera lens system according to claim 23, wherein a most object side lens is the aspherical lens.

28. A method of making an aspherical lens, comprising steps of:
   providing a member on a substrate member having a different composition from the substrate member;
   forming a first aspherical surface on the substrate member, the first aspherical surface contacting the member having the different composition;
   forming a second aspherical surface on the member having the different composition, the second aspherical surface not contacting the substrate member;
   a refractive index of a medium of the substrate member at d-line in which λ=587.56 nm being higher than a refractive index of a medium of the member having the different composition at d-line in which λ=587.56 nm, and
   satisfying the following conditional expression:

$0.4185 \leq |Na-Nb| \leq 0.50000$ where Na denotes a refractive index of a medium of the substrate member at d-line in which λ=587.56 nm, and Nb denotes a refractive index of a medium of the member having the different composition at d-line in which λ=587.56 nm.

29. A method of making an aspherical lens, comprising steps of:
   selecting a medium of a substrate member;
   selecting a medium of a member having a different composition from the substrate member and having a refractive index at d-line in which λ=587.56 nm that is lower than a refractive index of the medium of the substrate member at d-line in which λ=587.56 nm;
   forming the member having the different composition on the substrate member;
   forming a thickness of a center portion of the substrate member larger than that of the member having the different composition;
   forming a first aspherical surface on the substrate member, the first aspherical surface contacting the member having the different composition;
   forming a second aspherical surface on the member having the different composition, the second aspherical surface not contacting the substrate member; and
   satisfying the following conditional expressions:

$0.05000 \leq |Na-Nb| \leq 0.50000$ $2.3 \leq PV_{AB}/PV_B \leq 100$ where Na denotes the refractive index of the medium of the substrate member at d-line in which λ=587.56 nm, and Nb denotes the refractive index of the medium of the member having the different composition at d-line in which λ=587.56 nm, $PV_{AB}$ denotes PV value of a fabrication error relative to design value of the first aspherical surface, and $PV_B$ denotes PV value of a fabrication error relative to design value of the second aspherical surface.

30. A method of making an aspherical lens, comprising steps of:
   providing a member on a substrate member, the member having a different composition from the substrate member;
   forming a first aspherical surface on the substrate member, the first aspherical surface contacting the member having the different composition;
   forming a second aspherical surface on the member having the different composition, the second aspherical surface not contacting the substrate member; and
   satisfying the following conditional expression:

$2.3 \leq PV_{AB}/PV_B \leq 100$ where $PV_{AB}$ denotes PV value of a fabrication error relative to design value of the first aspherical surface, and $PV_B$ denotes PV value of a fabrication error relative to design value of the second aspherical surface.

31. The method according to claim 30, further comprising a step of:
   satisfying the following conditional expression:

$3.0 \leq PV_{AB}/PV_B \leq 40.0$.

32. The aspherical lens according to claim 16, wherein the member having the different composition is formed with substantially the same thickness within the effective diameter of the lens.

33. The aspherical lens according to claim 19, wherein the following conditional expression is satisfied:

$2.3 \leq PV_{AB}/PV_B \leq 100$ where $PV_{AB}$ denotes PV value of a fabrication error relative to design value of the first aspherical surface, and $PV_B$ denotes PV value of a fabrication error relative to design value of the second aspherical surface.

34. The aspherical lens according to claim 20, wherein a diameter of the aspherical lens is 40 mm to 60 mm.

35. The method according to claim 28, further comprising a step of:
   satisfying the following conditional expression:

$2.3 \leq PV_{AB}/PV_B \leq 100$ where $PV_{AB}$ denotes PV value of a fabrication error relative to design value of the first aspherical surface, and $PV_B$ denotes PV value of a fabrication error relative to design value of the second aspherical surface.

36. The method according to claim 28, wherein the substrate member is formed into a meniscus shape.

37. The method according to claim 29, wherein the substrate member is formed into a meniscus shape.

38. The method according to claim 30, further comprising the step of:
   satisfying the following conditional expression:

$0.05000 \leq |Na-Nb| \leq 0.50000$ where Na denotes a refractive index of a medium of the substrate member at d-line in which λ=587.56 nm, and Nb denotes a refractive index of a medium of the member having the different composition at d-line in which λ=587.56 nm.

39. A camera lens system equipped with an aspherical lens, the aspherical lens comprising:
   a substrate member;
   a member having a different composition from the substrate member and being formed on the substrate member;
   a boundary surface between the substrate member and the member having the different composition being formed by a first aspherical surface;
   a surface of the member having the different composition opposite to the boundary surface being formed by a second aspherical surface;
   a refractive index of a medium of the substrate member at d-line in which λ=587.56 nm being higher than a refractive index of a medium of the member having the different composition at d-line in which λ=587.56 nm;

a thickness of a center portion of the substrate member being larger than that of the member having the different composition; and the following conditional expression being satisfied:

$$0.05000 \leq |Na-Nb| \leq 0.50000$$

where Na denotes the refractive index of the medium of the substrate member at d-line in which $\lambda=587.56$ nm, and Nb denotes the refractive index of the medium of the member having the different composition at d-line in which $\lambda=587.56$ nm and wherein said aspherical lens is at a most object side of said camera lens system.

40. The camera lens system according to claim 39, wherein the following conditional expression is satisfied:

$$2 \leq PV_{AB}/PV_B \leq 300$$

where $PV_{AB}$ denotes PV value of a fabrication error relative to design value of the first aspherical surface, and $PV_B$ denotes PV value of a fabrication error relative to design value of the second aspherical surface.

41. An aspherical lens comprising:

a substrate member having at least one concave surface;

a member having a different composition from the substrate member and being formed on the concave surface of the substrate member;

a boundary surface between the substrate member and the member having the different composition being formed by a first aspherical surface;

a surface of the member having the different composition opposite to the boundary surface being formed by a second aspherical surface;

the member having the different composition being formed with substantially the same thickness within the effective diameter of the lens; and the following conditional expression being satisfied:

$$0.05000 \leq |Na-Nb| \leq 0.50000$$

where Na denotes the refractive index of the medium of the substrate member at d-line in which $\lambda=587.56$ nm, and Nb denotes the refractive index of the medium of the member having the different composition at d-line in which $\lambda=587.56$ nm.

42. The aspherical lens according to claim 41, wherein the following conditional expression is satisfied:

$$2PV_{AB}/PV_B \leq 300$$

where $PV_{AB}$ denotes PV value of a fabrication error relative to design value of the first aspherical surface, and $PV_B$ denotes PV value of a fabrication error relative to design value of the second aspherical surface.

43. An aspherical lens comprising:

a substrate member;

a member having a different composition from the substrate member and being formed on the substrate member;

a boundary surface between the substrate member and the member having the different composition being formed by a first aspherical surface;

a surface of the member having the different composition opposite to the boundary surface being formed by a second aspherical surface;

the aspherical lens having a diameter of 40 mm to 60 mm; and the following conditional expression being satisfied:

$$0.05000 \leq |Na-Nb| \leq 0.50000$$

where Na denotes the refractive index of the medium of the substrate member at d-line in which $\lambda=587.56$ nm, and Nb denotes the refractive index of the medium of the member having the different composition at d-line in which $\lambda=587.56$ nm.

44. The aspherical lens according to claim 43, wherein the following conditional expression is satisfied:

$$2 \leq PV_{AB}/PV_B \leq 300$$

where $PV_{AB}$ denotes PV value of a fabrication error relative to design value of the first aspherical surface, and $PV_B$ denotes PV value of a fabrication error relative to design value of the second aspherical surface.

* * * * *